United States Patent

Muller

[11] 4,054,526
[45] Oct. 18, 1977

[54] PRESSURIZED WATER TREATMENT BOTTLE

[76] Inventor: Jacques Muller, 127 bis Avenue du General de Gaulle, 92250 La Garenne, Colombes, France

[21] Appl. No.: 558,455

[22] Filed: Mar. 14, 1975

[30] Foreign Application Priority Data

Mar. 14, 1974 France .............................. 74.08698
Oct. 22, 1974 France .............................. 74.35420

[51] Int. Cl.² ......................................... B01D 27/08
[52] U.S. Cl. .................................. 210/245; 210/282; 210/416 DW; 222/189
[58] Field of Search ................ 210/416 W, 245, 352, 210/349, 321 R, 282; 222/189, 190

[56] References Cited

U.S. PATENT DOCUMENTS

| 417,703 | 12/1889 | Chichester | 210/416 DW X |
| 629,387 | 7/1899 | Nordtmeyer | 210/416 DW |
| 2,120,297 | 6/1938 | Reinecke | 222/189 X |
| 2,761,833 | 9/1956 | Ward | 210/282 X |
| 3,421,628 | 1/1969 | Barnabe et al. | 210/321 R X |
| 3,430,769 | 3/1969 | Sanzenbacher | 210/416 DW X |
| 3,565,256 | 2/1971 | Lueffler | 210/416 M X |

Primary Examiner—Frank A. Spear, Jr.
Attorney, Agent, or Firm—Young & Thompson

[57] ABSTRACT

A bottle for treating water by passing water through a treatment cartridge in the top of the bottle, the cartridge containing for example activated charcoal to remove chlorine and/or cationic resin to soften the water. The water in the bottle is pressurized by means of a spring-urged slidably sealed piston or manually operated pump or the like, and a valve manually operable from the exterior of the bottle regulates the flow rate of the discharge of the water from the bottle.

8 Claims, 7 Drawing Figures

PRESSURIZED WATER TREATMENT BOTTLE

To purify and improve the taste of drinking water, by eliminating the taste of chlorine and minerals, it has already been proposed to provide bottles having filters in their necks, the filters containing material such as active carbon which removes the taste of chlorine, and cationic resins which retain the minerals such as calcium and soften the water.

Such constructions are not entirely satisfactory, because if the water is suitable for cooking, its flow rate is too slow.

The present invention accordingly has for its object the provision of a bottle provided with a filter or the like for removing an undesired component from the water, and having means to pressurize the contents of the bottle so that its flow rate upon leaving the bottle can be regulated by means of a lever that actuates a valve to open the valve to a greater or lesser extent, whereby the delivery can be actuated in the same way as that of a siphon bottle charged with gas under pressure.

The pressurizing means of the present invention are located in the lower part of the bottle and can have various forms in order to pressurize the liquid, for example by means of a spring that urges a piston, or a sealed flexible accordion-pleated chamber, or even a compressed gas which may be contained in a cartridge or may be air pumped from outside by means of a small pump, or other known means acting through the movement or expansion of members in the bottle.

The upper part of the bottle comprises a removable housing that receives one or more interchangeable cartridges containing the treatment material. At the outlet of the bottle, there is disposed a needle valve or the like which is controlled at will by means of an external lever or handle, to open to the desired degree the exit passage for the treated water thereby to control the water flow.

Other objects, features and advantages of the present invention will become apparent from a consideration of the following description, taken in connection with the accompanying drawings, in which.

Figure 1:
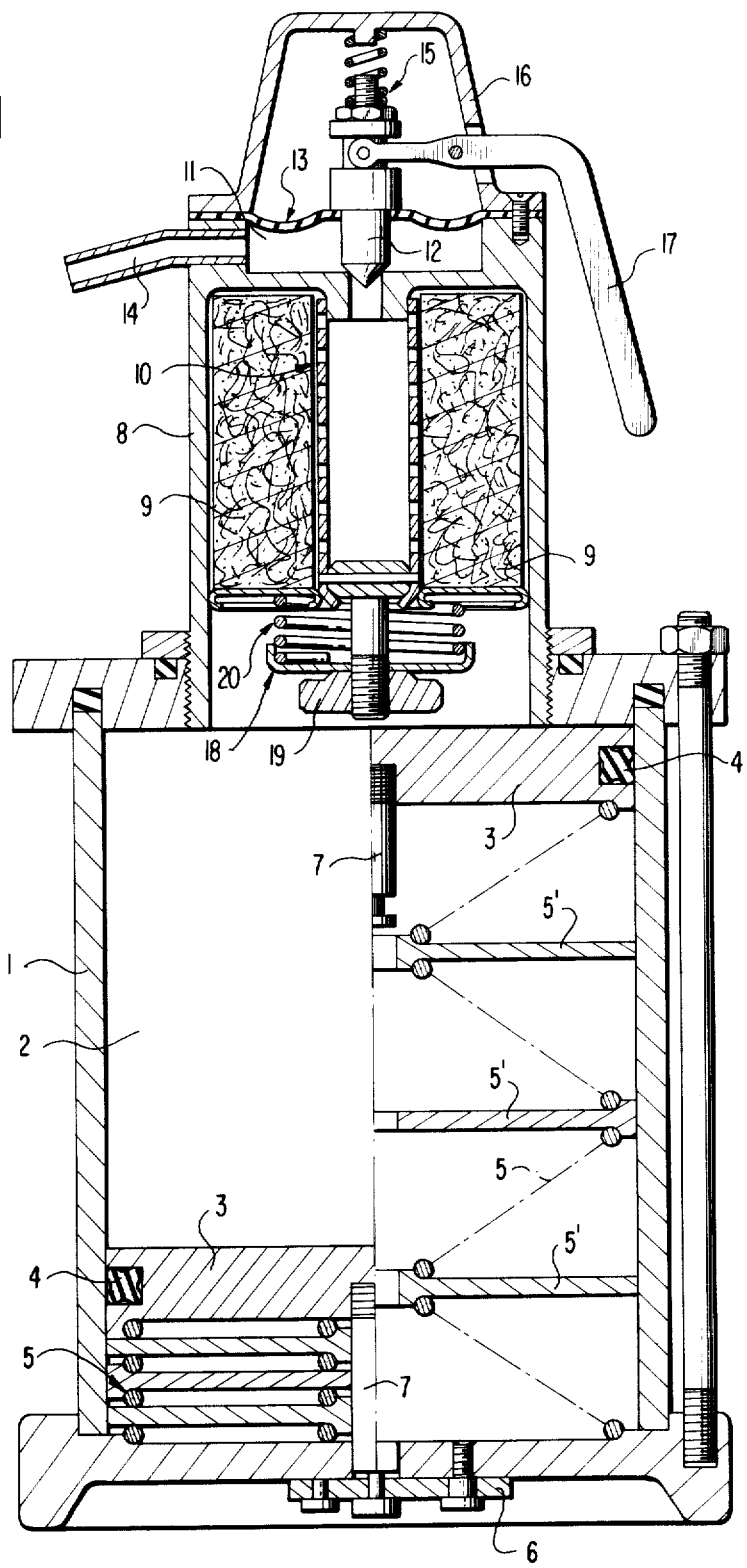
FIG. 1 is a cross-sectional view, with the spring shown compressed on the left side and the spring shown extended on the right side, of a bottle according to the present invention having a cartridge of treatment material and means for pressurizing the contents of the bottle.

Referring now to the drawings in greater detail, and first to FIG. 1 thereof, there is shown a first embodiment of bottle according to the present invention, the bottle 1 comprising a body 2 having pressurizing means which, in this case, is constituted by a piston 3 that slides in body 2 in a fluidtight manner assured by seal 4 disposed peripherally about piston 3. A coil compression spring 5, whose coaxial alignment is maintained by a plurality of slidable annular plastic plates 5' disposed between sections of spring 5, advances piston 3 coaxially within body 2. A latch 6 on the outside of the base of the bottle, permits temporarily retaining the piston in its lowered position thanks to a projection 7 fixed to the underside of piston 3 that passes through the bottom of the bottle and is releasably engageable with the swinging latch 6.

Screw-threadedly mounted on the upper end of the bottle is a housing 8 that receives an annular cartridge 9 of treatment material that in turn surrounds a perforated cylinder 10. The interior of cylinder 10 communicates with the outlet chamber 11 closed by needle valve 12 which traverses a sealing diaphragm 13 in sealed relationship. A discharge tube 14 directs the evacuated water as desired. A coil compression spring 15 acts between a cap 16 and needle valve 12 to urge needle valve 12 toward closed position. Cap 16 also secures the margins of membrane 13 in pressure-tight relationship to housing 8. Manually operable lever 17, manipulable from outside the bottle, is pivotally mounted on cap 16 and engages at its inner end with needle valve 12 to regulate opening of needle valve 12 to control the volume of discharge of the water.

Cartridge 9 is interchangeable and is filled with, for example, activated carbon or charcoal and/or water softener of the cationic resin type or other type. It is releasably held in housing 8 by means of member 18 that is screwed down by a nut 19 against a compression spring 20 that bears against the lower end of cartridge 9, the screw-threaded shaft 19' on which nut 19 turns being fixedly secured to perforated cylinder 10, so that when housing 8 is unscrewed from body 2 and nut 19 is unscrewed to permit removal of member 18 and spring 20, a spent cartridge 9 can simply fall out of its recess in housing 8 and be replaced by a fresh cartridge, the parts being then reassembled in reverse order.

The operation of the embodiment of FIG. 1 is as follows:

With the housing 8 unscrewed, the piston 3 is manually pressed down against the action of spring 5 until projection 7 extends through the base of the bottle and the latch 6 is swung into the temporary retaining position shown in FIG. 1. The water to be treated is then introduced into the bottle and the housing 8 is screwed back on, there being a suitably fresh cartridge 9 therein. Then the latch 6 is released and the water is placed under pressure by the piston 3. Thereafter, manipulation of the lever 17 permits the dispensing of treated water at a desired flow rate.

Figure 2:
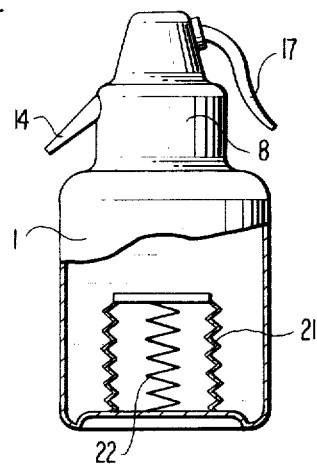
FIGS. 2–6 are somewhat schematic views, partly in cross section, on a reduced scale, of various bottles showing various other means for pressurizing the liquid therein.

Clearly, other means may be used for pressurizing the water. For example, in FIG. 2, there if shown an accordion-folded sealed bellows 21 that is acted on by a spring 22.

Figure 3:
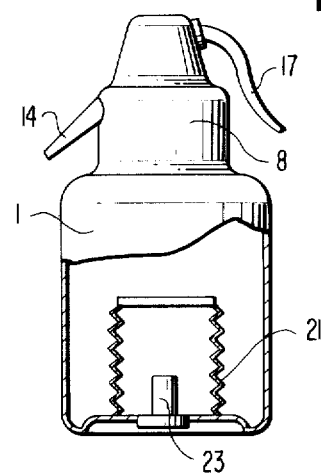

Spring 22 could also be replaced, as shown in FIG. 3, by means of a cartridge of compressed gas 23. Cartridge 23 could also dispense gas directly to the contents of the bottle, as in FIG. 4; and in this case a discharge tube 24 that communicates at its upper end with cartridge 9 (not shown) extends almost to the base of the bottle.

Figure 4:
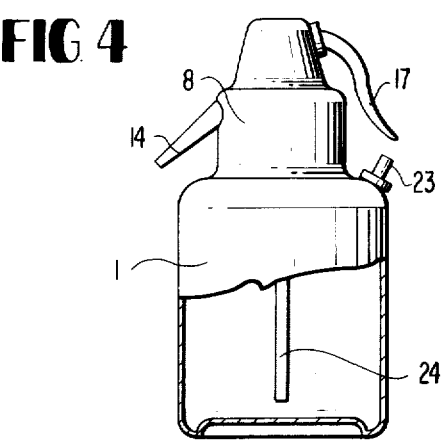
Figure 5:
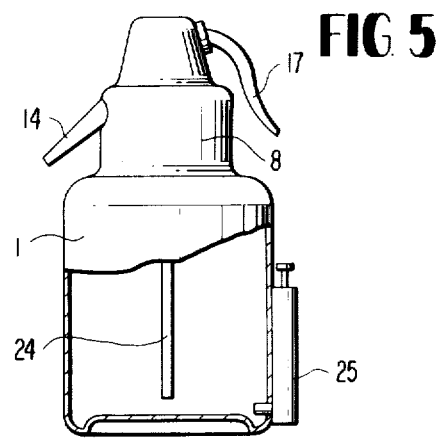
Figure 6:
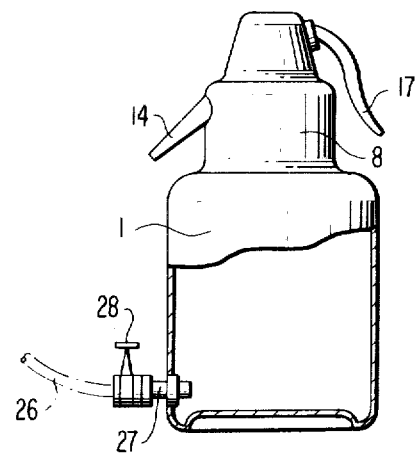

As shown in FIG. 5, the cartridge 23 can be replaced, in the FIG. 4 embodiment, with a manually actuated small pump 25. Alternatively, the water can be pressurized as seen in FIG. 6, by attaching the bottle directly to a source 26 of water under pressure, which is introduced into bottle 1 through a connection 27 under the control of a valve 28.

It is also to be understood that the material in cartridge 9 may itself contain additives to the water, for example, for the dispensing of mineral water or other water containing other desired ingredients.

Figure 7:
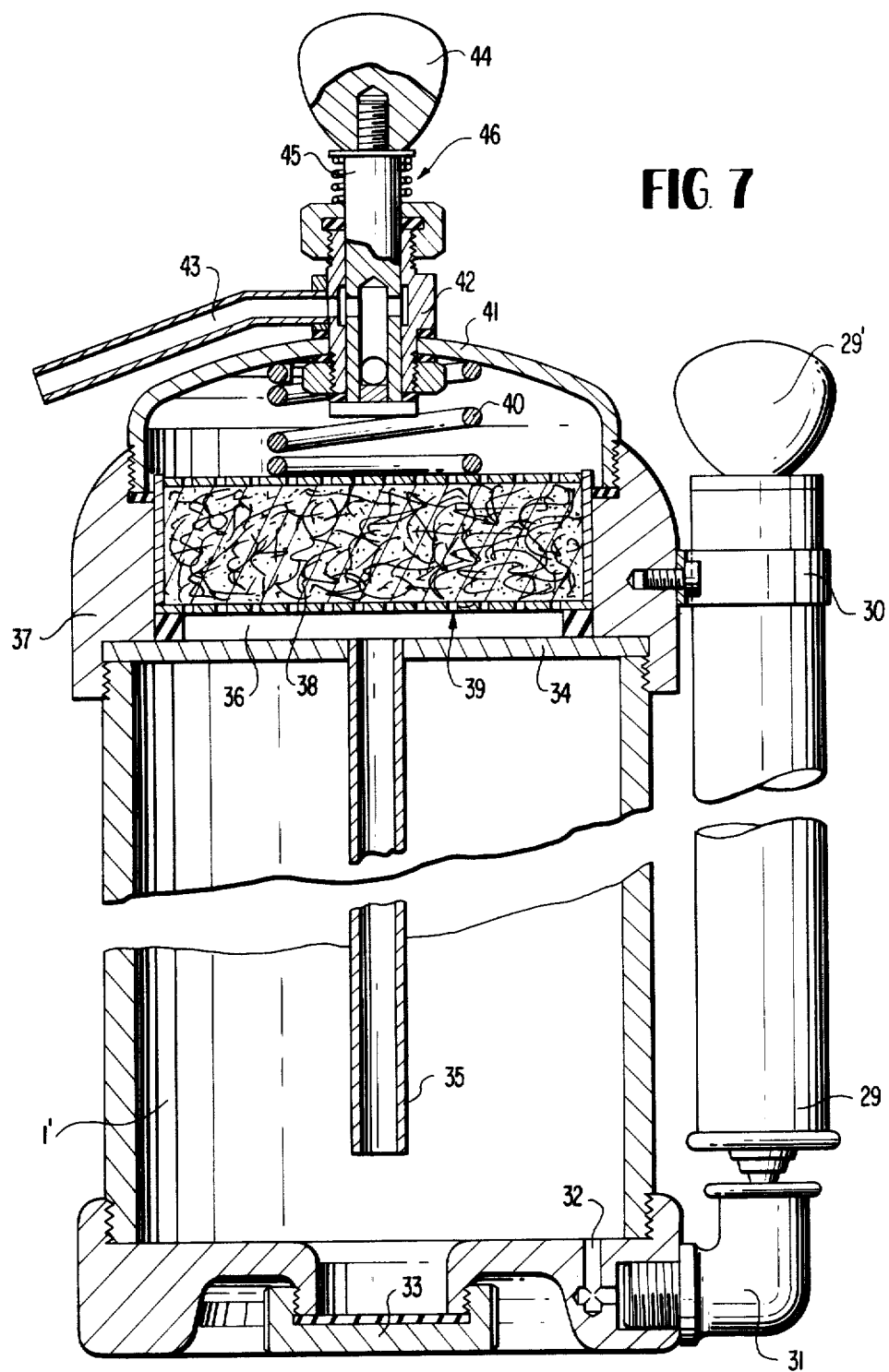
FIG. 7 is an enlarged cross-sectional view of a further embodiment of bottle according to the present invention.

Referring now to the embodiment of FIG. 7, the bottle 1' is provided with a piston pump 29 fixed to the bottle by a collar 30, its outlet 31 being connected to the lower part of the bottle for increasing the pressure in the bottle by a passageway 32 whereby air under pressure can be injected into the bottle by manipulation of the piston of pump 29 while grasping the knob 29'.

In this embodiment, the water is introduced into the bottle by unscrewing a cap 33 in the bottom of the bottle, filling the water through the opening thus provided, and replacing the cap 33.

The upper end of the bottle is closed by a plate 34. A tube 35 secured centrally to plate 34 traverses plate 34 and extends almost to the bottom of the bottle so as to establish communication between the interior of the bottle and a chamber 36 formed by a circular member 37 which also provides the housing for an interchangeable cartridge 38 that rests on a perforated plate 39 and that is maintained by a spring 40 that bears on the underside of cap 41 that in turn is screwed in place on circular piece 37. Of course, cap 41 can be secured to piece 37 by other known means.

Cap 41 carries a member 42 having an outlet tube 43. A knob 44 acts on a valve 45 slidably mounted in member 42 so as to permit the selective dispensing of liquid from within the bottle. Spring 46 urges valve 45 toward closed position, the dispensing position being achieved by pressing on knob 44. It will of course be understood that the valve 45 is merely a conventional slide valve which in its various positions closes and opens to various degrees, the passageway between the underside of cap 41 and outlet 43, and that to this end, valve 45 is centrally and laterally bored in conventional manners so as to provide or prevent that communication. From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A bottle for dispensing treated water, comprising a container having in its upper portion a removable cover, a replaceable cartridge of material for treating water in said cover, screw-threaded means removably carried by said cover, a coil compression spring acting between said screw-threaded means and said cartridge to urge said cartridge into said cover, means defining a passageway for water through said material from the interior of the container to the exterior of the container, means for placing water within the container under positive pressure, valve means on said cover for regulating the flow rate of water out of the container, and manually operated means on said cover for controlling said valve means from outside the container.

2. A bottle as claimed in claim 1, said pressurizing means comprising a piston slidable in the container in sealed relationship with the container, means for introducing water into the container between the cartridge and the piston, and means on the side of the piston opposite the cartridge for urging the piston toward the cartridge.

3. A bottle as claimed in claim 2, said urging means comprising coil compression spring means.

4. A bottle as claimed in claim 3, and circular plates spaced between portions of said spring means for maintaining said spring means and said piston coaxial with the container.

5. A bottle as claimed in claim 2, and latch means on the outside of the base of the container engageable with means on the piston when the piston is farthest from the cartridge, releasably to retain the piston in said farthest position from the cartridge.

6. A bottle as claimed in claim 1, and spring means acting between said cover and said cartridge to retain said cartridge in seated position in the top of the bottle.

7. A bottle as calimed in claim 1, said pressurizing means comprising a piston pump secured to the outside of the bottle and communicating with the interior of the bottle, and means for manually operating said piston pump.

8. A bottle as claimed in claim 1, said cover comprising a circular piece surrounding the top of the bottle, said screw threaded means comprising a cap screwthreadedly received in said circular piece, said circular piece providing an annular seat for said cartridge.

* * * * *